(12) United States Patent
Deyle et al.

(10) Patent No.: US 9,843,385 B2
(45) Date of Patent: Dec. 12, 2017

(54) OPTICAL COMMUNICATION FOR BODY MOUNTABLE DEVICES

(71) Applicant: VERILY LIFE SCIENCES LLC, Mountain View, CA (US)

(72) Inventors: Travis Deyle, San Jose, CA (US); Brian Otis, Saratoga, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 539 days.

(21) Appl. No.: 14/303,936

(22) Filed: Jun. 13, 2014

(65) Prior Publication Data
US 2015/0365166 A1 Dec. 17, 2015

(51) Int. Cl.
*H04B 10/116* (2013.01)
*H04B 1/3827* (2015.01)

(52) U.S. Cl.
CPC ............ *H04B 10/116* (2013.01); *H04B 1/385* (2013.01); *H04B 2001/3866* (2013.01)

(58) Field of Classification Search
CPC . H04B 10/1149; H04B 10/11; H04B 10/1121; H04B 10/1143; H04B 10/114; H04B 1/385; H04B 10/116; H04B 2001/3866
See application file for complete search history.

(56) References Cited

U.S. PATENT DOCUMENTS

| | | | |
|---|---|---|---|
| 8,446,341 B2 | 5/2013 | Amirparviz et al. | |
| 8,608,310 B2 | 12/2013 | Otis et al. | |
| 2004/0044418 A1 | 3/2004 | Goldstein | |
| 2006/0033879 A1* | 2/2006 | Covannon | G02B 27/017 351/221 |
| 2009/0109353 A1 | 4/2009 | Liu et al. | |
| 2011/0028807 A1 | 2/2011 | Abreu | |
| 2012/0146804 A1 | 6/2012 | Kim et al. | |
| 2012/0259188 A1 | 10/2012 | Besling | |
| 2013/0063557 A1 | 3/2013 | Saigo et al. | |
| 2014/0081178 A1 | 3/2014 | Pletcher et al. | |
| 2014/0098226 A1 | 4/2014 | Pletcher et al. | |
| 2014/0243971 A1* | 8/2014 | Pugh | G02C 7/04 623/6.22 |

(Continued)

FOREIGN PATENT DOCUMENTS

WO    WO 2013/151728 A1    10/2013

OTHER PUBLICATIONS

PCT/US2015/030390—International Search Report and Written Opinion, mailed Aug. 27, 2015, 10 pages.

(Continued)

*Primary Examiner* — Ted Wang
(74) *Attorney, Agent, or Firm* — Christensen O'Connor Johnson Kindness PLLC

(57) ABSTRACT

A system includes one or more optical emitters, a transceiver, and a body mountable device. The optical emitters emit light and are configured to be used in luminaires. The transceiver is coupled to receive input data from a data network and coupled to selectively modulate the optical emitters to transmit the optical data. Selectively modulating the optical emitters is in response to the input data. The body mountable device includes a photodetector coupled to receive the optical data and processing circuitry configured to initiate an action in response to receiving the optical data from the photodetector.

21 Claims, 6 Drawing Sheets

(56) References Cited

U.S. PATENT DOCUMENTS

2015/0302738 A1* 10/2015 Geerlings .............. G08C 17/02
340/5.25

OTHER PUBLICATIONS

Brokaw, L., "Harald Haas's Li-Fi Vision: Light Bulbs That Transmit Data," MITSloan: Management Review, Blog: Aug. 15, 2011, 3 pages. Retrieved from: http://sloanreview.mit.edu/article/harald-haass-li-fi-vision-light-bulbs-that-transm it-data/.

Dietz, P. et al., "Very Low-Cost Sensing and Communication Using Bidirectional LEDs," Mitsubishi Electric Research Laboratories, Inc., Jul. 2003, Cambridge, Massachusetts, 19 pages.

Webster, G., "'Li-Fi' provides a light bulb moment for wireless web," Cable News Network, Turner Broadcasting System, Inc., Sep. 28, 2012, 3 pages. Retrieved from: http://www.cnn.com/2012/09/28/tech/lifi-haas-innovation/index.html.

Jamieson, I., "Visible Light Communication (VLC) Systems," (n.d.), Bio Electromagnetic Research Initiative, 6 pages. Retrieved Jun. 12, 2014 from: http://bemri.oro/visible-light-communication.html.

"Optical Communication," (n.d.), 7 pages. Retrieved Jun. 12, 2014 from: http://en.wikipedia.org/wiki/Optical_communication.

U.S. Appl. No. 13/559,261, filed Jul. 26, 2012, Pletcher, et al.
U.S. Appl. No. 13/559,261, filed Jul. 26, 2012, Pletcher et al.
U.S. Appl. No. 13/559,261, filed Jun. 28, 2013, Wiser et al.

* cited by examiner

DETECTOR/EMITTER MODE

OPTICAL COMMUNICATION FOR BODY MOUNTABLE DEVICES

TECHNICAL FIELD

This disclosure relates generally to mobile communications, and in particular but not exclusively, relates to optical communications for body mountable devices.

BACKGROUND INFORMATION

Body mountable devices including "wearables" have increased in usability as computing resources, batteries, and peripheral electronics become smaller and more efficient. Wearable technology has applications in head mounted display ("HMDs"), patches, arm bands, watches, integration into clothing, and otherwise. Wearables often are specifically designed for a specific task or measurement. Since wearables sometimes have limited user interface features, they may require prompting from another device to perform their task or measurement. Other devices (e.g. smart phones, tablets, computers) may have more accessible or convenient user interfaces to initiate a task or measurement that the wearable will perform. After performing a given task, the wearable may be best utilized by reporting the measurement to another device for further analysis or viewing. Therefore, communications systems on body mountable devices can increase the functionality of the body mountable device. Given the often small constraints with body mountable devices, their communication systems often have to be designed within the form factor limitations of the device involved. Communication systems having increased accessibility in addition to being small, light, and efficient would be advantageous to reduce form factors and increase use cases and integration into different body mountable devices.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for optical communication for body mountable devices are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
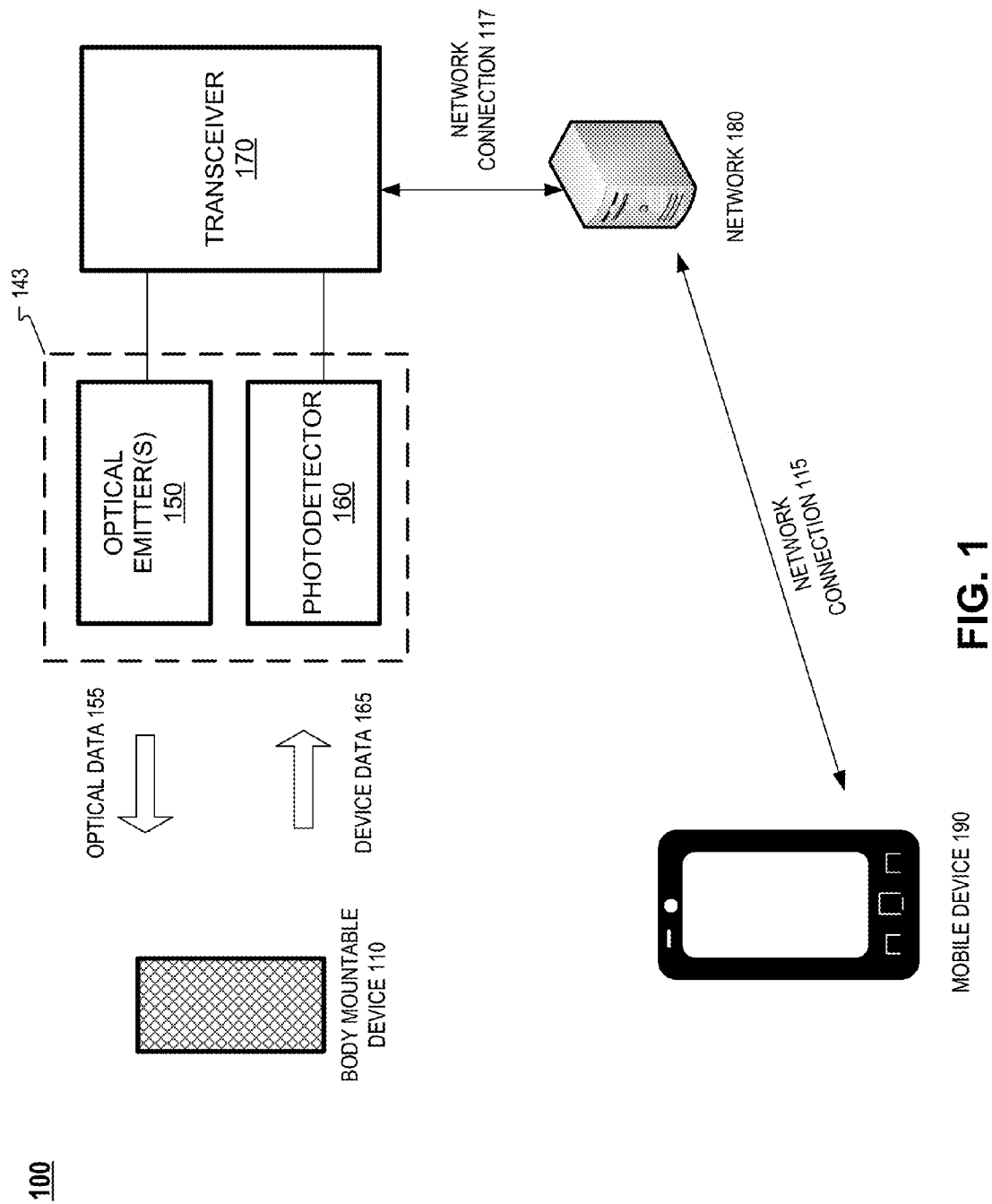
FIG. 1 illustrates an example system diagram that includes a network, a transceiver, optical emitters, and a body mountable device, in accordance with an embodiment of the disclosure.

FIG. 1 illustrates an example system diagram that includes a mobile device 190, a network 180, a transceiver 170, a photodetector 160, optical emitters 150, and a body mountable device 110, in accordance with an embodiment of the disclosure. Network 180 may include switches and other routing circuitry. Network 180 may include wired and wireless access points. Mobile device 190 can access network 180 via network connection 115. Mobile device 190 may be a smartphone, tablet, a smart watch, or other network connectable device that includes a user interface for user input. Network connection 115 may be provided via intermediate networks (e.g. wireless provider network) that are unillustrated for simplicity. In one example network 180 is a private network that has wired and wireless access points in a given building structure. Mobile device 190 may access network 180 directly by connecting to a wireless access point or mobile device 190 may access network 180 indirectly by first connecting to a wireless provider that then accesses network 180.

Transceiver 170 can access network 180 via network connection 117, which may be a direct connection (via wired or wireless access points) to network 180 or an indirect connection (via another network such as a wireless network). Transceiver 170 is coupled to receive input data from network 180 via network connection 117. Transceiver 170 is also coupled to one or more optical emitters 150 which emit light. The light emitted by optical emitters 150 may be visible or non-visible. Transceiver 170 is coupled to selectively modulate the one or more optical emitters 150 in response to the input data received from network 180 to transmit optical data 155 via the light emitted from the optical emitters.

In one embodiment, optical emitters 150 are light-emitting-diodes ("LEDs). Optical emitters 150 may be configured for use in a luminaire 143. Optical emitters 150 may be designed to have a form factor that are easily installed into legacy luminaire light fixtures or optical emitters 150 may be integrated into a luminaire light fixture. For example, optical emitters 150 may be configured to screw into common existing sockets that receive conventional incandescent light bulbs or fluorescent light bulbs. For the purposes of this disclosure, "luminaire" is defined as a light fixture for illuminating a space (e.g. commercial space or residential space). Luminaires may also be used to illuminate outdoor space such as streets, parks, or outdoor venues. A luminaire includes a power input to receive electrical power to power its light emitters that emit ambient light for the space. Luminaires commonly include reflectors to direct ambient light from light emitters (e.g. light bulbs) in the desired direction, although this may be less important when LEDs are the light emitters. Luminaires exist for ceiling, wall-mount, street light, and portable (e.g. desk lamp or floor lamp) applications.

Optical emitters 150, photodetector 160, and transceiver 170 may be included in a mobile device such as a smartphone, tablet, or a head mounted display ("HMD"). Optical emitters 150, photodetector 160, and transceiver 170 may also be included in a television, a settop box, or a computer, or otherwise. The display screens or LEDs on these devices may serve as optical emitters 150 and be modulated (at a frequency above what the human eye can discern) to include optical data. Image sensors on these devices may serve as photodetector(s) 160. All of these devices commonly have access to the internet and other private data networks capable of sending and receiving data.

Body mountable device 110 includes a photodetector (not illustrated) to receive optical data 155. Body mountable device 110 also includes processing circuitry (not illustrated) that is coupled to the photodetector and the processing circuitry is coupled to initiate an action in response to receiving optical data 155. In some embodiments, body mountable device 110 includes an outward facing emitter that emits device light. In those embodiments, the processing circuitry is coupled to selectively drive/modulate the outward facing emitter to generate device data 165. The outward facing emitter may emit non-visible (e.g. infrared light).

Transceiver 170 is coupled to photodetector(s) 160 to receive device data 165 and coupled to send device data to network 180 via network connection 117. Photodetector(s) 160 may be optionally mounted to luminaire 143. Transceiver 170 may also be mounted to or integrated into luminaire 143.

Body mountable device 110 may include devices worn on or about the body. Body mountable devices include wearables such as HMDs, patches, arm bands, watches, pedometers, wearables integrated into clothing, and otherwise. Body mountable devices may include implantable devices that are implanted just under skin. Body mountable devices are used by people and people tend to congregate around facilities and infrastructure that includes lighting. Therefore, a communication system that utilizes existing infrastructures (e.g. luminaires) and/or common requirements for buildings and structures has particular relevance to body mountable devices. Furthermore, as body mountable devices become smaller and smaller, the device space available to integrate antennas for radio communications may become scarce. Consequently, optical communications that require less device space than radio communication is increasingly attractive. In addition to utilizing common building infrastructure (e.g. luminaires), other existing "ambient" devices (e.g. televisions, computers, mobile devices, settop boxes) that are commonly available can be leveraged to provide data to body mountable device 110.

Figure 2A:
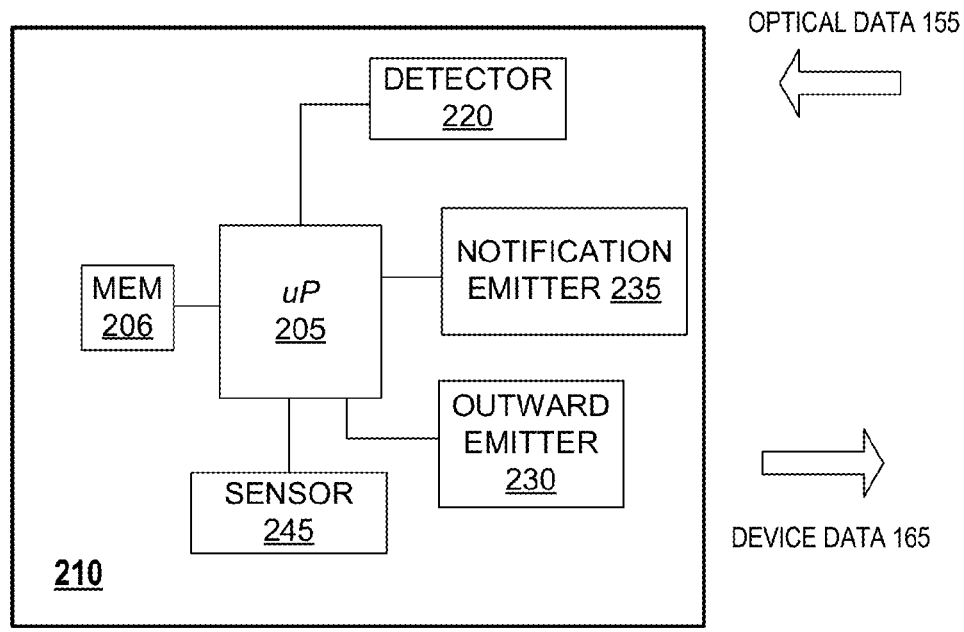
FIG. 2A illustrates a block diagram of an example body mountable device that includes processing circuitry, a photodetector, and emitters, in accordance with an embodiment of the disclosure.

FIG. 2A illustrates an example body mountable device 210 that includes processing circuitry 205, a photodetector 220, an outward facing emitter 230, a notification emitter 235, a memory 206, and a sensor 245, in accordance with an embodiment of the disclosure. Body mountable device 210 also includes a power source (not illustrated) to power the illustrated elements. The power source may include a battery and/or a photovoltaic element that generates electrical power by harvesting light.

Processing circuitry 205 may include a combination of analog and/or digital circuitry. In FIG. 2A, processing circuitry 205 is illustrated as a microprocessor. Processing circuitry 205 is coupled to read and write memory 206. Memory 206 may store instructions for execution on processing circuitry 205. Processing circuitry 205 is coupled to initiate a measurement or test by sensor 245. Sensor 245 is coupled to send the measurement or the results of the test to processing circuitry 205. Sensor 245 may measure biometric data. In one embodiment, sensor 245 is a militarized glucose meter. In one embodiment, sensor 245 measures biometrics that are representative of a blood alcohol level of a wearer of body mountable device 210.

Photodetector 220 is positioned to receive optical data 155. Photodetector 220 includes a photodiode, in one embodiment. Processing circuitry 205 is coupled to read an output of photodetector 220 and analyze optical data 155. After analyzing optical data 155, processing circuitry 205 may initiate an action in response to optical data 155. For example, optical data 155 may be a digital word that instructs processing circuitry to initiate a measurement using sensor 245.

Body mountable device 210 may include an outward facing emitter 230 to facilitate outbound communication. For example, outward facing emitter 230 can be driven/modulated by processing circuitry 205 to send device data 165 via light emitted by outward facing emitter 230. Outward facing emitter 230 may send non-visible light (e.g. infrared) signals that include device data 165. Outward facing emitter 230 may also emit visible light.

Body mountable device 210 may include notification emitter 235 that is different from outward facing emitter 230. Notification emitter 235 may be an LED or plurality of LEDs that emit visible light to serve as a visual notification for a wearer of body mountable device 210, whereas outward facing emitter 230 may be an LED that emits non-visible light. Notification emitter 235 may include more than one LED that emit different colors of light (e.g. red/green/blue). Different colored LEDs within notification emitter 235 may be selectively driven to generate a variable spectrum of visible light by mixing the different emission colors. Notification emitter 235 may include a pixel matrix of multi-color LEDs and corresponding driving transistors that form a micro display for notifying a wearer of body mountable device 210. In one embodiment, notification emitter 235 also serves as outward facing emitter 230 by directing at least a portion of the notification light from notification emitter 235 outward for detection by photodetector 160.

Figure 2B:
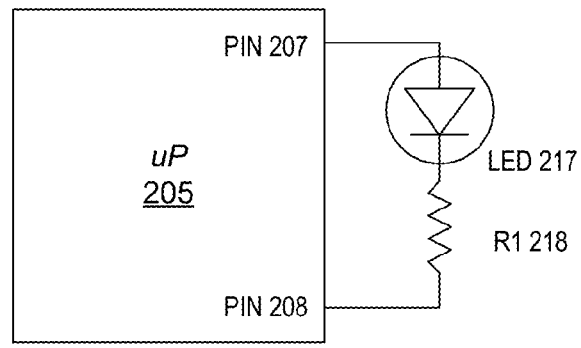
FIG. 2B illustrates an example configuration of processing circuitry for driving an LED in both a detector and emitter mode, in accordance with an embodiment of the disclosure.

FIG. 2B illustrates an example configuration of processing circuitry 205 for driving an LED 217 in both a detector and emitter mode, in accordance with an embodiment of the disclosure. Since device space may be at an especially high premium on body mountable device 210, FIG. 2B illustrates a configuration that utilizes LED 217 in a dual purpose role as both detector 220 and as emitter 235 or 230.

To drive LED 217 to emit light (emitter mode), pin 207 is driven high which yields a voltage (e.g. 2.5V) on pin 207. At the same time, pin 208 is driven low (or set to ground) which generates a positive voltage across LED 217 and resistor R1 218 that causes LED 217 to emit light. In detector mode, LED 217 is sensitive to light at and above the wavelength that the LED 217 emits. Therefore, optical data 155 must be sent with light that is compatible to be sensed by LED 217. To begin detector mode, pin 208 is driven high (e.g. 2.5 VDC) while pin 207 is grounded. This reverse biases LED 217 and charges the capacitance of LED 217. Of course, those skilled in the art understand that diodes include a capacitance inherent in the p-n junction of the diode. After reverse biasing LED 217, pin 208 is set as an input pin which allows the photocurrent of LED 217 to discharge the capacitance of LED 217. An increased intensity of light incident on LED 217 increases the photocurrent generated by LED 217. As the photocurrent discharges the capacitance of LED 217, the voltage on pin 208 decreases. Therefore, measuring the time it takes for the capacitance of LED 217 to be discharged will be representative of the intensity of light on LED 217. The digital input threshold (e.g. 1.25 VDC) of pin 208 is a convenient threshold that can be used to determine the end time of the discharging of the capacitance of LED 217. Hence, the time it takes for LED 217 to discharge from a digital high voltage (e.g. 2.5V) to the digital input threshold of pin 208 can be conveniently used to measure the intensity of light on LED 217. This detector mode process can be repeated over and over to sense optical data included in light from optical emitters 150.

Figure 3A:
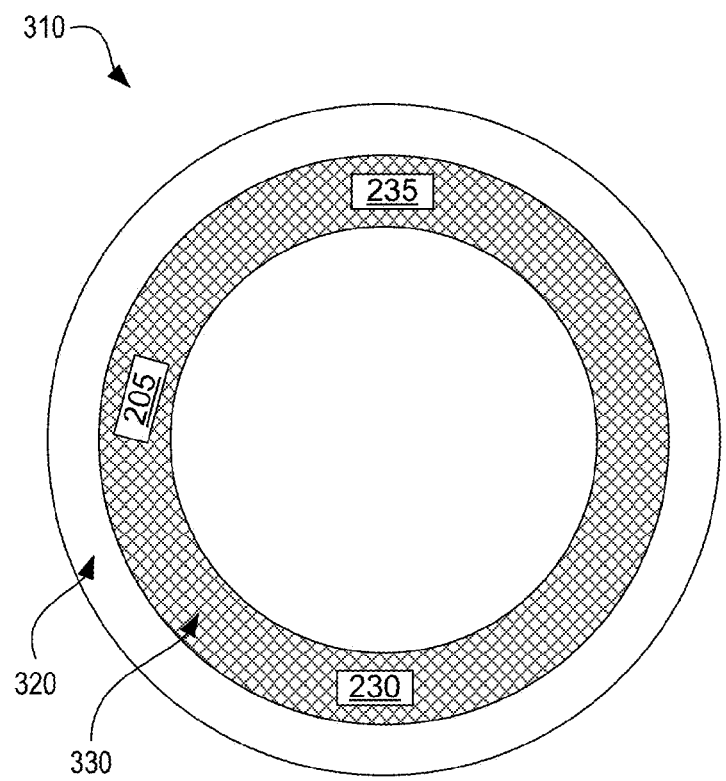
FIG. 3A illustrates a top view of a smart contact lens that includes processing circuitry, a notification emitter, and an outward facing emitter, in accordance with an embodiment of the disclosure.

FIG. 3A illustrates a top view of a smart contact lens ("SCL") 310 that includes processing circuitry 205, notification emitter 235, and an outward facing emitter 230, in accordance with an embodiment of the disclosure. SCL 310 is one example of a body wearable device 210. Although not illustrated, SCL 310 may include every element shown in FIG. 2A. SCL 310 includes transparent material 320 that is made from a biocompatible material suitable for a contact lens. Substrate 330 is illustrated as a substantially flattened ring disposed atop or embedded within transparent material 320. In one embodiment, the flattened ring has a diameter of about 10 millimeters, a radial width of about 1 millimeter, and a thickness of about 50 micrometers.

Substrate 330 includes one or more surfaces for mounting the elements illustrated in FIG. 2A, although only processing circuitry 205, notification emitter 235, and an outward facing emitter 230 are illustrated in FIG. 3A. The different elements may be disposed on both sides of substrate 330. In one embodiment, substrate 330 includes a multi-layer circuit board. In one embodiment, substrate 330 is made of a rigid material such as polyethylene terephthalate ("PET"). In one embodiment, substrate 330 is made of flexible material such as polyimide or organic material. Substrate 330 may be disposed along an outer perimeter of SCL 310 so as not to interfere with a viewable region of SCL 310 that a wearer of SCL 310 would be looking through. However, in one embodiment, substrate 330 is substantially transparent and does not substantially interfere with a wearer's view, regardless of disposition location.

Figure 3B:
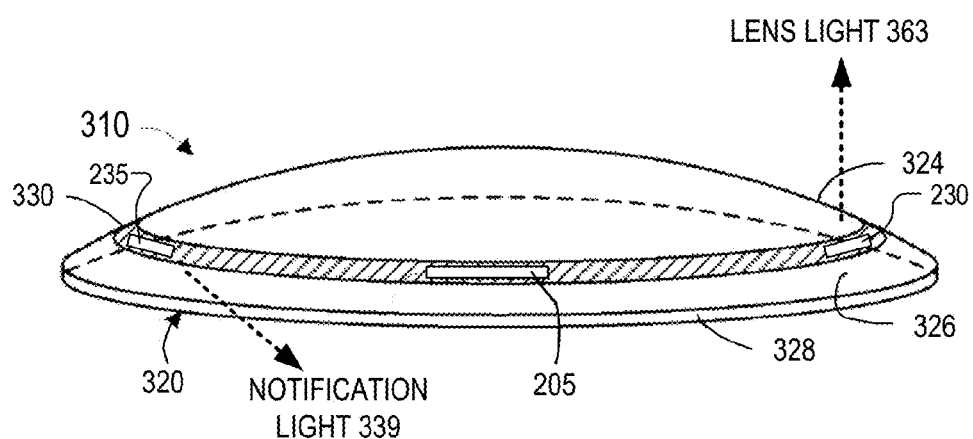
FIG. 3B illustrates a side view of a smart contact lens that includes processing circuitry, a notification emitter, and an outward facing emitter, in accordance with an embodiment of the disclosure.

FIG. 3B illustrates a side view of a SCL 310 that includes processing circuitry 205, notification emitter 235, and an outward facing emitter 230, in accordance with an embodiment of the disclosure. FIG. 3B shows transparent material 320 has a concave surface side 326 opposite a convex surface side 324. Concave surface side 326 will have substantial contact with the eye of a wearer of SCL 310. A circular outside edge 328 connects concave surface side 326 and convex surface side 324.

FIG. 3B shows that outward facing emitter 230 is positioned to emit lens light 363 that includes lens data 365 in an outward facing direction so that it can be received by photodetector(s) 160. In contrast, notification emitter 235 is positioned to emit notification light 339 in an eyeward direction so that the wearer of SCL 310 would be able to see notification light 339. The eyeward direction may be toward a pupil of a wearer of SCL 310 or the eyeward direction may be across SCL 310 and be refracted or reflected into the pupil. An additional notification emitter (not illustrated) may be disposed in a different location on substrate 330 than notification emitter 235 to provide notification light to a different viewable region than notification emitter 235. SCL 310 may be weighted using similar techniques as contacts that are designed for astigmatisms to keep notification emitter 235 in a consistent location (e.g. upper right hand corner of eye) so that notification light 339 is emitted from a consistent position.

Figure 3C:
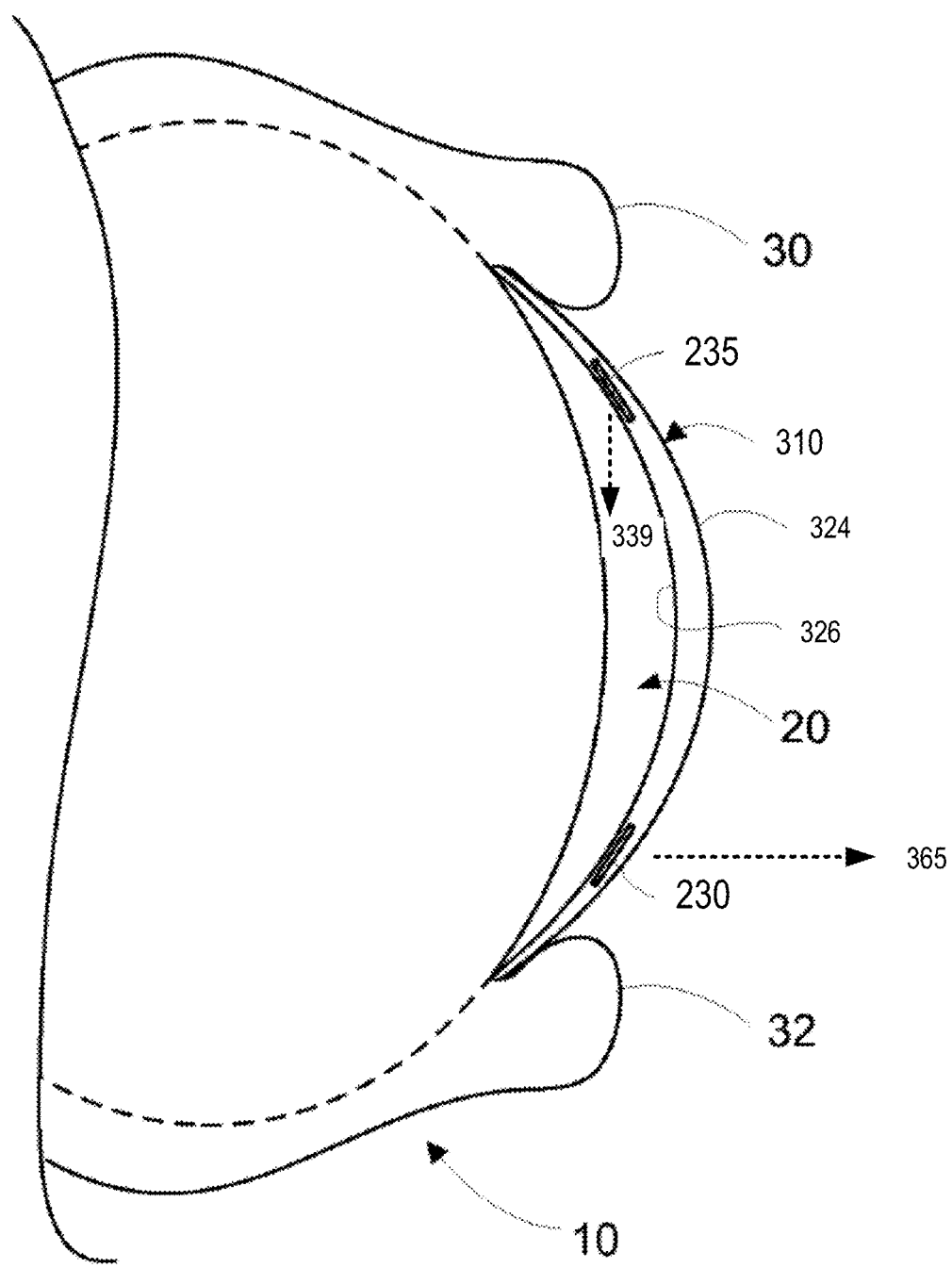
FIG. 3C illustrates a cross-section side view of an example smart contact lens mounted on a corneal surface of an eye, in accordance with an embodiment of the disclosure.
Figure 3E:
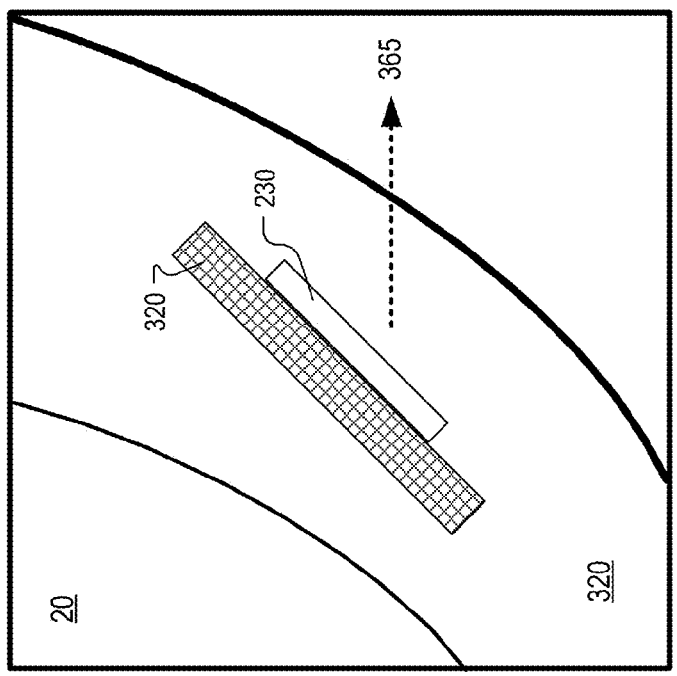
FIG. 3E illustrates a zoomed-in view of an outward facing emitter included in FIG. 3C, in accordance with an embodiment of the disclosure.
Figure 3D:
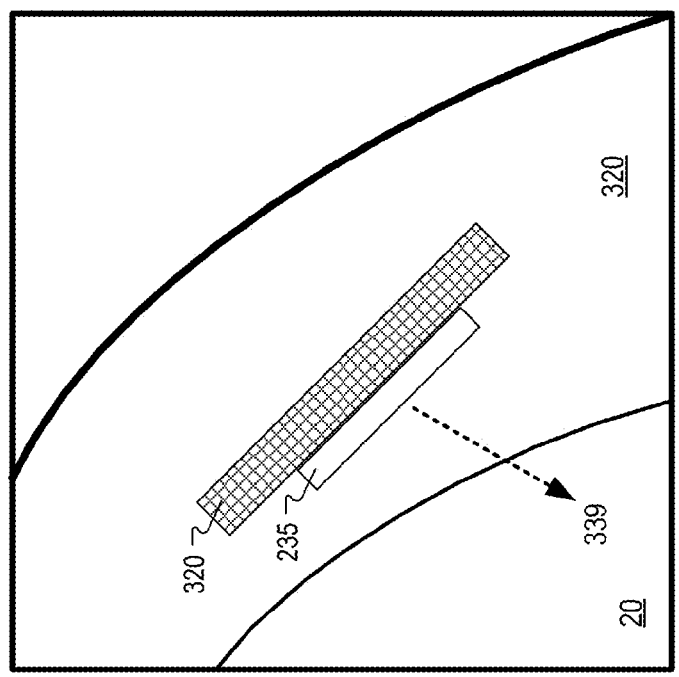
FIG. 3D illustrates a zoomed-in view of a notification emitter included in FIG. 3C, in accordance with an embodiment of the disclosure.

FIG. 3C illustrates a cross-section side view of an example SCL 310 mounted on a corneal surface 20 of an eye 10, in accordance with an embodiment of the disclosure. SCL 310 is shown mounted under upper eyelid 30 and lower eyelid 32. FIG. 3D illustrates a zoomed-in view of the notification emitter 235 included in FIG. 3C, in accordance with an embodiment of the disclosure. Notification emitter 235 is disposed on a cornea facing side of substrate 330 so that it can emit notification light 339 in an eyeward direction. FIG. 3E illustrates a zoomed-in view of the outward facing emitter 230 included in FIG. 3C, in accordance with an embodiment of the disclosure. Outward facing emitter 230 is disposed on an outward facing side of substrate 330 that is opposite the cornea facing side so that it can send lens data 365 to photodetectors 160.

Figure 4:
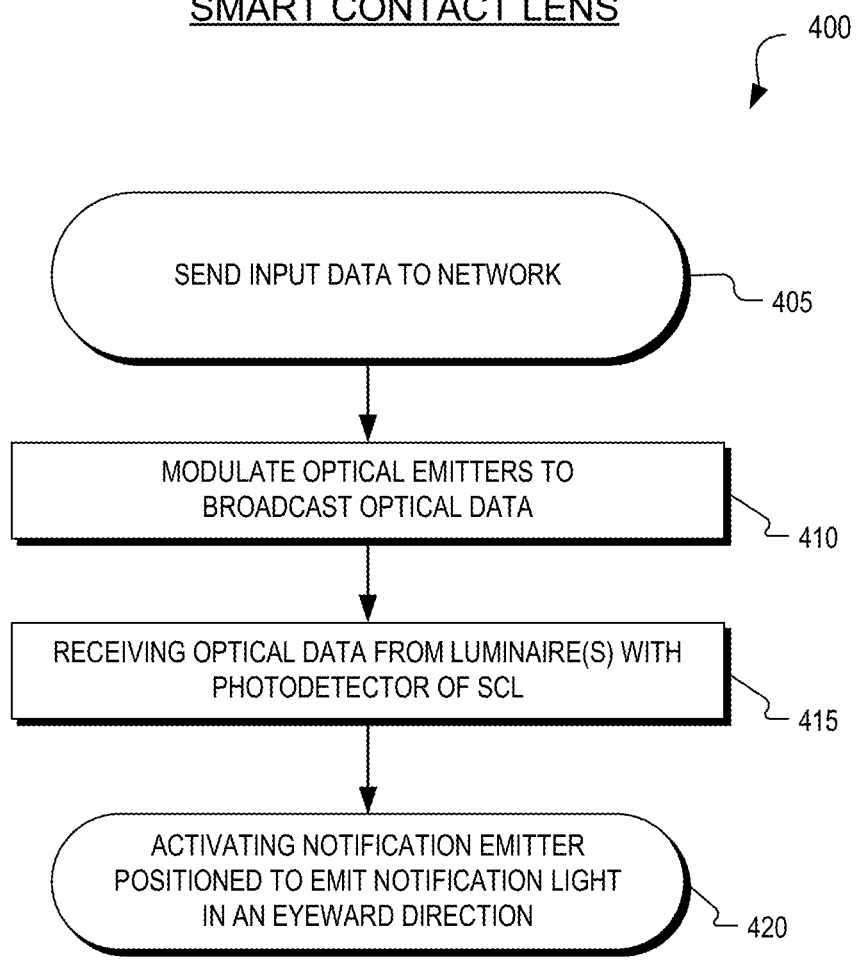
FIG. 4 includes a flow chart showing a process of generating notifications for a smart contact lens, in accordance with an embodiment of the disclosure.

FIG. 4 includes a flow chart showing a process 400 of generating notifications for a smart contact lens, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, input data is sent to a network. In one example, mobile device 190 sends the input data to network 180. Optical emitters (e.g. optical emitters 150) are modulated to broadcast the input data as optical data (e.g. optical data 155) in process block 410. The optical emitters are included in or mounted to one or more luminaires. Transceiver 170 may modulate the optical emitters in one embodiment. The optical emitters may be LEDs installed in one or more luminaires. In one embodiment, at least one luminaire in each room of a building or campus has a local transceiver 170 modulating one or more optical emitters 150 to broadcast the optical data to an entire building or campus.

In one embodiment, the input data (and corresponding optical data) is encrypted so that only a body mountable device (e.g. SCL 310) with the proper encryption key can decrypt the optical data. The sender (e.g. mobile device 190) of the input data may encrypt the data. The body mountable device may be previously paired with the sender of the input data to coordinate encryption/decryption keys. Memory 206 of body mountable device 210 may store the decryption key for processing circuitry 205 to access.

In process block 415, the optical data is received from the optical emitters of the luminaires by a photodetector (e.g. photodetector 220) of the body mountable device (e.g. SCL 310). The notification emitter (e.g. emitter 235) is activated by processing circuitry 205 in process block 420. Notification emitter 235 is positioned to emit notification light 339 in an eyeward direction, when activated. Notification light 339 may be different colors, positions or have different durations, depending on the optical data. The presence or absence of notification light 339 may indicate a category of notification or a specific notification to wearer of an SCL. The flashing frequency, duration, color or combination of colors from different notification emitters may also indicate a category of notification or a specific notification.

In one example notifications are used to guide a wearer of SCL 310 to a destination via turn-by-turn directions. A destination could be selected by a user using a mobile device. Once the destination is selected, the mobile device could be pocketed and the visual turn-by-turn direction given by notification light from notification emitter(s) in SCL 310. The mobile device may determine a position of the user (using GPS or network triangulation) and send the position to a remote server. The remote server then may send a turn-by-turn direction back to the mobile device based on the position sent to the remote server. The mobile device may then send the turn-by-turn direction to network 180 as input data that is broadcasted as optical data 155. Notification light can then be emitted by SCL 310 to indicate a direction of travel for the user to get to the desired destination. In one embodiment, green notification light is a directive to the wearer of SCL 310 to turn left and a blue notification light is a directive to the wearer of SCO to turn right. In another embodiment, a location (e.g. upper left or upper right) of the notification light indicates direction. Other visual cues (e.g. duration or frequency of notification light) corresponding with a direction or length of travel to the desired destination can be utilized to direct the wearer of SCL 310 to the destination. One potential advantage of turn-by-turn directions via SCL 310 is that a user does not have to continually view her mobile device to receive turn-by-turn directions. And, because of the possible ubiquity of modulated optical emitters 150 inside a building, SCL 310 is always able to receive the optical data 155.

In another example, notification light 339 in SCL 310 is used to notify a wearer of SCL 310 of a biometric measurement. A request to initiate a biometric measurement may be made by the wearer of SCL 310 using a user interface on a mobile device or a computer. A parent, doctor, or caregiver could also initiate the request. The request would be routed to network 180 via network connection 115 and be delivered to transceiver 170 as input data. The transceiver would broadcast the input data as optical data 155 which can be received by photodetector 220. Processing circuitry 205 may be configured to initiate a biometric measurement with sensor 245 in response to the optical data. The biometric measurement may include a glucose measurement, a blood alcohol level measurement, or otherwise. Processing circuitry 205 may drive a specific color of notification emitter based on the results of the test. In one embodiment, a green notification emitter is momentarily activated to alert a wearer of SCL 310 that the test was negative and a red notification emitter is momentarily activated to alert a wearer of SCL 310 that the test was positive (e.g. glucose level is approaching a certain threshold). The specific results of the test may be stored in memory 206 for downloading at a later time or the specific results of the test may be sent as lens data 365 to photodetector(s) 160 and back to mobile device 190 via network 180.

In another example, notification light 339 in SCL 310 is representative of a notification corresponding to a mobile application. In one embodiment, a color of the notification light 339 corresponds to a particular category of mobile application (e.g. social media, email, calendar). In a final example, public safety announcements (e.g. fire alarm, amber alerts) can be routed through network 180, be broadcasted as optical data 155, and utilize notification light 339 to alert wearers of SCL 310 of important information. This notification capability may have particular relevance for persons with disabilities, namely hearing impairments, as many important announcements are auditory.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
    one or more optical emitters that emit light;
    a transceiver coupled to receive input data from a data network and coupled to selectively modulate the optical emitters to transmit optical data, wherein selectively modulating the optical emitters is in response to the input data; and
    a body mountable device for wearing on a human body of a user or implanting into the human body of the user, the body mountable device including:
        a photodetector coupled to receive the optical data; and
        processing circuitry configured to initiate an action in response to receiving the optical data from the photodetector, wherein the optical data includes turn-by-turn directions, and wherein the processing circuitry activates a notification emitter to indicate a direction of travel for a wearer of the body mountable device.

2. The system of claim 1, wherein the one or more optical emitters are configured to be used in luminaires.

3. The system of claim 1, wherein the body mountable device includes the notification emitter positioned to emit notification light, wherein the processing circuitry is coupled to activate the notification emitter in response to the optical data.

4. The system of claim 1, wherein the optical data includes a notification corresponding to a mobile application, and wherein a color of the notification light corresponds with a particular category of mobile application.

5. The system of claim 1, wherein the processing circuitry is configured to selectively drive the photodetector as an outward emitter for generating device data.

6. The system of claim 1, wherein the body mountable device includes an outward facing emitter positioned to emit device data.

7. A system comprising:
one or more optical emitters that emit light;
a transceiver coupled to receive input data from a data network and coupled to selectively modulate the optical emitters to transmit optical data, wherein selectively modulating the optical emitters is in response to the input data; and
a body mountable device for wearing on a human body of a user or implanting into the human body of the user, the body mountable device including:
a photodetector coupled to receive the optical data; and
processing circuitry configured to initiate an action in response to receiving the optical data from the photodetector,
wherein the body mountable device includes a sensor coupled to the processing circuitry, wherein the processing circuitry is configured to initiate a biometric measurement with the sensor in response to the optical data.

8. A system comprising:
one or more optical emitters that emit light;
a transceiver coupled to receive input data from a data network and coupled to selectively modulate the optical emitters to transmit optical data via the light, wherein selectively modulating the optical emitters is in response to the input data; and
a smart contact lens ("SCL") including:
a photodetector positioned to receive the optical data;
a notification emitter positioned to emit notification light in an eyeward direction; and
processing circuitry configured to initiate an action in response to receiving the optical data from the photodetector, wherein the processing circuitry is coupled to activate the notification emitter in response to the optical data.

9. The system of claim 8, wherein the SCL includes an additional notification emitter positioned to emit additional notification light in the eyeward direction, wherein the additional notification emitter emits the additional notification light having a different color than the notification light.

10. The system of claim 8, wherein the optical data includes turn-by-turn directions, and wherein the processing circuitry activates the notification emitter to indicate a direction of travel for a wearer of the SCL.

11. The system of claim 8, wherein the optical data includes a notification corresponding to a mobile application, and wherein a color of the notification light corresponds with a particular category of mobile application.

12. The system of claim 8, wherein the one or more optical emitters include light-emitting-diodes ("LEDs").

13. The system of claim 8, wherein the optical emitters are configured for use in luminaires.

14. The system of claim 8, wherein the smart contact lens includes an outward facing emitter positioned to emit device data.

15. A system comprising:
one or more optical emitters that emit light;
a transceiver coupled to receive input data from a data network and coupled to selectively modulate the optical emitters to transmit optical data via the light, wherein selectively modulating the optical emitters is in response to the input data; and
a smart contact lens ("SCL") including:
a photodetector positioned to receive the optical data;
processing circuitry configured to initiate an action in response to receiving the optical data from the photodetector; and
a memory coupled to the processing circuitry, wherein the optical data is encrypted and the memory stores a decryption key accessible to the processing circuitry for decrypting the optical data.

16. The system of claim 15 further comprising:
a mobile device for sending the input data to the data network, wherein the mobile device is configured to encrypt the optical data with an encryption key paired with the decryption key stored in the memory.

17. A system comprising:
one or more optical emitters that emit light;
a transceiver coupled to receive input data from a data network and coupled to selectively modulate the optical emitters to transmit optical data via the light, wherein selectively modulating the optical emitters is in response to the input data; and
a smart contact lens ("SCL") including:
a photodetector positioned to receive the optical data;
processing circuitry configured to initiate an action in response to receiving the optical data from the photodetector; and
a sensor coupled to the processing circuitry, wherein the processing circuitry is configured to initiate a biometric measurement with the sensor in response to the optical data.

18. The system of claim 17, wherein the SCL includes a notification emitter positioned to emit notification light in an eyeward direction, wherein the processing circuitry is coupled to activate the notification emitter in response to the biometric measurement.

19. A system comprising:
one or more optical emitters that emit light;
a transceiver coupled to receive input data from a data network and coupled to selectively modulate the optical emitters to transmit optical data via the light, wherein selectively modulating the optical emitters is in response to the input data; and
a smart contact lens ("SCL") including:
a photodetector positioned to receive the optical data; and
processing circuitry configured to initiate an action in response to receiving the optical data from the photodetector,
wherein the photodetector is a light-emitting-diode ("LED") coupled to be selectively reversed biased by nodes of the processing circuitry, the LED further coupled to the nodes to be selectively driven as an outward facing emitter for emitting lens light, the processing circuitry coupled to modulate the lens light to generate lens data.

20. The system of claim 19, wherein the LED is configured to emit infrared light as the lens light.

21. The system of claim 19 further comprising a second photodetector, wherein the transceiver is coupled to receive the lens data from the second photodetector and coupled to send the lens data to the data network.

* * * * *